United States Patent [19]

Holzmüller et al.

[11] Patent Number: 4,818,297

[45] Date of Patent: Apr. 4, 1989

[54] PROCESS FOR REMOVING SOLVENTS FROM BULK MATERIAL

[75] Inventors: Reinhold Holzmüller, Paderborn-Elsen; Roland Lücke, Paderborn, both of Fed. Rep. of Germany

[73] Assignee: Gebruder Lodige Maschinenbau-Gesellschaft, Paderborn, Fed. Rep. of Germany

[21] Appl. No.: 120,132

[22] Filed: Nov. 13, 1987

Related U.S. Application Data

[63] Continuation of Ser. No. 436,050, Oct. 22, 1982, abandoned.

[30] Foreign Application Priority Data

Oct. 29, 1981 [DE] Fed. Rep. of Germany ....... 3142985

[51] Int. Cl.[4] ........................... B08B 7/04; B01D 3/38

[52] U.S. Cl. ........................................ 134/12; 134/30; 134/37; 34/10; 34/37; 159/16.3; 159/25.1; 159/DIG. 3; 202/175; 202/234; 203/92; 203/95

[58] Field of Search ........................ 203/95, 92, 93, 96, 203/97, 99; 202/175, 234, 265, 170, 176; 34/10, 22, 36, 37; 159/DIG. 3, 900, 901, 25.1, 25.2; 134/12, 30, 37, 22.19, 25.3; 162/1-3, 5; 568/913; 260/428; 536/56, 127

[56] References Cited

U.S. PATENT DOCUMENTS

| | | | |
|---|---|---|---|
| 591,041 | 10/1897 | Harrison et al. | 202/175 |
| 832,863 | 10/1906 | Kerr | 202/175 |
| 1,127,452 | 2/1915 | Koch | 202/175 |
| 1,538,265 | 5/1925 | Arnold | 202/175 |
| 1,609,712 | 12/1926 | Guignard | 202/175 |
| 2,459,951 | 1/1949 | Metzner | 202/265 |
| 2,832,663 | 4/1958 | Drelich | 162/5 |
| 2,991,298 | 7/1961 | Raffaeta | 203/85 |
| 3,169,537 | 2/1965 | Fuhring | 202/175 |
| 3,511,843 | 5/1970 | Lewis | 202/175 |
| 4,048,007 | 9/1977 | Valle-Riestra | 162/5 |

*Primary Examiner*—Wilbur Bascomb

*Attorney, Agent, or Firm*—Thomas J. Greer, Jr.

[57] ABSTRACT

To remove solvents such as alcohol from bulk material the solvent-laden bulk material is intensively loosened mechanically into a virtual fluidized bed through which a liquid in gaseous phase such as steam is passed so that the solvent having a lower boiling point than water is expelled from the bulk material and is evacuated with excess steam while at least part of the steam condenses on the particles of the bulk material which thereby is humidified. The solvent expelled from the bulk material is separated from the steam and can be used again. The treatment is carried out in a closed vessel in which the bulk material and the steam are moved relative to each other.

3 Claims, 1 Drawing Sheet

PROCESS FOR REMOVING SOLVENTS FROM BULK MATERIAL

This is a continuation of application Ser. No. 436,050 filed Oct. 22, 1982 and now abandoned.

The invention relates to a process for removing solvents such as alcohols from bulk material. The invention also relates to a device for carrying out this process.

Certain bulk materials such as cellulose derivatives are treated—for instance washed—with relatively volatile solvents containing for instance alcohol or consisting of alcohol, which solvents after treatment must be totally removed from the bulk material and preferably shall be used again. It is known to that end to heat-dry the cellulose derivatives washed with solvents and to collect the rising solvents so released. This requires relatively large drying chambers and much drying energy is consumed. Another drawback is that by heat-drying the humidity content of the bulk material drops below the value desirable for further processing so that the bulk material following the drying process carried out to expel the solvents again must be humidified with water to obtain the proper degree of humidity.

The object of the invention is to remove solvents from bulk material such as cellulose derivatives in a manner both simpler and more energy-saving than heretofore.

To this end the invention proposes to introduce in gaseous or vapor state a liquid condensing at normal temperature and of a boiling point higher than the solvent into the bulk material laden with solvent while intensively mechanically shaken and by removing the solvent expelled from the bulk material together with the uncondensed portion of the introduced vapor in order to feed back the solvent once separated from the evaporated liquid to a new application.

The rate of diffusion of the solvent to be expelled is controlled by the excess-added amount of vaporized treatment liquid like steam at the boiling point of the mixture of solvent and vaporized treatment liquid. This makes possible an almost complete expulsion of the solvent from the solids of the bulk material.

In accordance with the invention therefore the solvent is expelled from the bulk material by introducing a liquid having a higher boiling point in its gaseous or vaporized phase into the bulk materials loosened up in a kind of fluidized bed, at least part of the vaporized liquid condensing, whereby the solvent such as alcohol will be separated from the bulk material. The solvent rises from the bulk material and can be evacuated in simple manner together with the uncondensed steam. Finally, the solvent can be separated from the steam also in a simple manner.

The condensed portion of the vaporized treatment liquid that was introduced into the bulk material has the effect that the bulk material after separation of the solvent has a certain residual humidity, so that in most events the proper humidity content and the proper density of the bulk material can be set. If required, water may be added at another site to adjust the proper humidity content.

Accordingly, the solvent residues can be removed from the bulk material and the desired humidity content and density of the material can be adjusted in one operational stage, whereafter the bulk material can be processed further or be put to its final use. No large drying chambers or lengthy drying procedures with the accompanying high heating energy are needed. Rather the treatment can be carried out in small space and relatively little amount of energy is used, namely only for generating the fluidized bed and for generating the steam for expelling the solvent and for heating the vessel.

Preferably, steam is introduced to drive the solvent out of the mechanically loosened and thereby fluidized bulk material. Said steam is simple to generate and economical, by means of which the desired humidity of the bulk material can be most appropriately adjusted.

In a preferred practical embodiment of the process of the invention, the mechanically loosened bulk material is made into a kind of fluidized bed and continuously moved in one direction during treatment, while the vaporized treatment liquid is passed through this bulk material, for instance by suction or blowing, thereby at least partly retarding the flow rate of the bulk material. The treatment therefore is continuous and in a sort of counterflow, making it practical too in a continuously operating system where the apparatus preceding and following this treatment stage also are operating continuously. After the solvent such as alcohol has been expelled, it is possible to simultaneously carry out product formulations, that is, to concentrate granulate or change the structure of the bulk material, so that the bulk material immediately after being treated can be processed further or even can be wrapped-up as end product for final use.

Even though the vaporized treatment liquid such as steam is preferably blown into the fluidized bulk material and is then evacuated from it, the treatment is carried out practically at no gauge pressure, that is, no pressure chamber is required. The treatment preferably takes place at a temperature approximately between 90° C. and 100° C. (about 360° K. to 371° K.), so that steam can be supplied at a pressure equal to or larger than 1 bar. The steam expands to atmospheric pressure when having entered the space containing the loosened bulk material and it raises the temperature of said bulk material to the desired value. Part of the steam condenses on the particles of the bulk material, while the solvent having a lower boiling point than water—such as an alcohol—becomes volatile and together with the uncondensed steam escapes from the fluidized bulk material, whereupon it can be evacuated through a main. The treatment agent having a higher boiling point, for instance steam, so-to-speak, expels the solvent having a lower boiling point, for instance the alcohol, from the bulk material and remains at least partly in the bulk material to adjust its humidity to a specific residual value. Because the bulk material is loosened into a kind of fluidized bed for the treatment, the introduced steam is able to more or less uniformly reach all the particles of this bulk material, so that no substantial impedance is encountered when expelling the solvent.

It was found that in this manner and for treatment durations between 2 and 15 minutes, solvents such as alcohol can be completely removed from bulk materials such as cellulose derivatives, the freed solvent being collected and used again. The process can be carried out continuously because a fluidized bed of bulk material continuously migrating through a treatment chamber remains within a relatively narrowly bounded space over the time desired for treatment. The process moreover is easy to perform and can be readily controlled. It is applicable to all bulk materials which should not be rendered substantially drier by the removal of the solvent or other washing liquid. Cellulose derivatives are one example of such bulk materials being treated with steam to remove the washing liquid such as alcohol therefrom and to adjust their residual humidity content at a desired value. Where required, water can be furthermore added to adjust the desired final humidity and material density.

The object of the invention is further solved by a device suitable to carry out the process of the invention, said device comprising a cylindrical vessel with a loosening means coaxially mounted within it, with an intake for solvent-laden bulk material and a discharge for the expelled solvent in the area at one of the ends of the vessel and a discharge for the bulk material freed from the solvent at the other end, the loosening means including a driven central shaft with radially arranged arms evenly distributed and mounted on this shaft which exert a throwing effect both in the circumferential and in one longitudinal direction of the vessel on the bulk material whereby it is loosened into a kind of fluidized bed and moreover is slowly moved toward the discharge, while a vaporized treatment liquid like steam passes through the fluidized bulk material to expel from it the solvent and simulatneously to humidify it, part of the steam condensing on the particles of the bulk material.

To adjust the amount of steam passing through the bulk material a further feature of the invention provides an adjustable inlet valve for the steam. The steam can be introduced into the vessel thus that it arrives in the region of knife-like tools which will intensively mix it with the bulk material. Moreover, the walls of the vessel can be heated to prevent cooling effects and to assure the proper temperature of treatment.

The drawing shows schematically an illustrative embodiment of the device to carry out the process of the invention.

Figure 2:
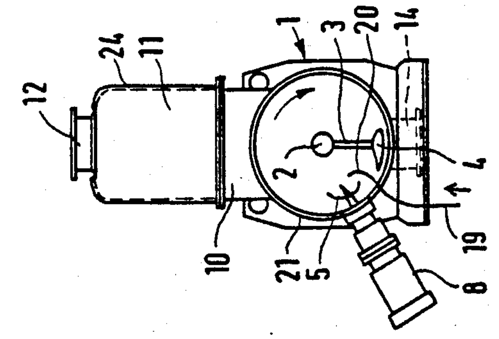
FIG. 2 is a cross-section of the device of FIG. 1 along line I—I.

The device includes a cyclindrical vessel 1 within which the shaft 2 of a loosening means is mounted along the longitudinal axis of said vessel, said shaft being provided with radially projecting arms 3. The outer end of each arm 3 is provided with a plowshare-type loosening tool 4 mounted in rotatable manner about the longitudinal axis of the particular arm but which can be fixed in the desired final position to this arm. A motor M drives shaft 2 thus that the tools 4 throw up the bulk material fed into the vessel 1 and move it from the inlet to the discharge end, the bulk material being whirled up within the vessel 1 so that a kind of mechanically generated fluidized bed is achieved.

Further tools 5 with chalice-shaped mutually crossing blades 6 are mounted in the lower region of the vessel 1 between the revolving paths of the plowshare-type loosening tools 4 and are fastened to a shaft 7 passing through the wall of the vessel 1. Each shaft 7 is fastened to an own drive motor 8 outside the vessel 1. However, the blades 6 can also be rectilinear and be arranged in several planes one above the other.

Figure 1:
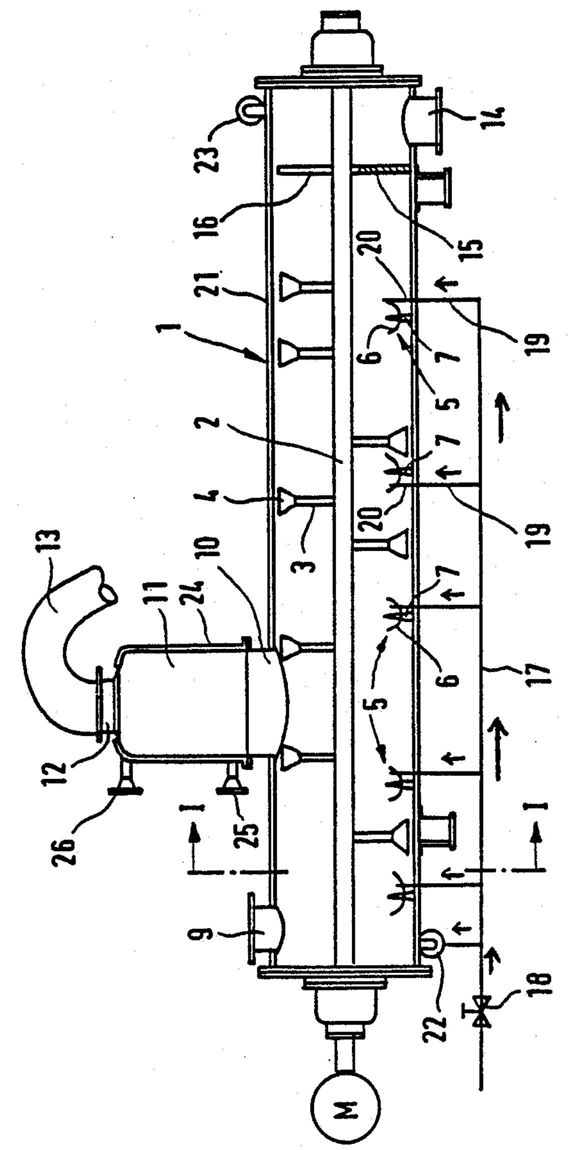
FIG. 1 is a longitudinal section of the device.

A stub 9 is located at one end of the vessel 1 and serves as the inlet for the continuous feed of bulk material laden with a solvent to be separated from the bulk material within the device. Another stub 10 located near this stub 9 on the vessel 1 and a dome 11 is mounted on stub 10, the outlet stud 12 of which is connected to a line 13 to discharge, for instance by suction, solvents which may be mixed with steam and/or air. As shown by FIG. 1, line 13 initially leads downwards to prevent a backflow of condensate into dome 11 and hence into vessel 1.

A stub 14 at the opposite end of vessel 1 and at its bottom serves as the discharge means for the treated bulk material and can be connected to a discharge line not shown in further detail. Closely before this stub 14 there is inside the vessel 1 a disk-like baffle plate 15 with an aperture 16 in the upper area so that the revolving loosening tools 4 can throw the bulk material fed into the vessel 1 through baffle plate 15 into stub 14, while this baffle however keeps part of the bulk material inside the vessel 1 to maintain a constant filling level. Steam is fed through a line 17 with an integrated regulated valve 18 and is introduced through branch lines 19 into the vessel 1 in the region of the individual tools 5. To that end a lance 20 passing into the vessel 1 is connected to each branch line 19, and, as best shown in FIG. 2, this lance 20 enters the vessel 1 from below and terminates close to the particular tool 5. However, the lances 20 also can be alternatively inserted from above into the vessel 1. What is determinant is that their discharge apertures are directed at the tools 5 so that the steam enters the vessel 1 in the area of effectiveness of these tools 5 so that the bulk material in the vessel 1 shall be rapidly and intensively mixed with steam by means of the revolving tools 5.

The steam supplied through the lances 20 heats the bulk material laden with solvent to a treatment temperature of about 90° to 100° C. To prevent undesired cooling at the vessel wall, the vessel is provided with a double jacket 21 into which flows stream from line 17 through a stub 22 and from which the steam is discharged through another stub 23. The dome 11 too is provided with a double jacket 24 permitting the circulation of heating steam through stubs 25 and 26.

The steam fed into the vessel 1 flows through the bulk material loosened into a type of fluidized bed within the vessel 1 and migrating toward the stub 14, this flow being partly in counterflow and partly in cross-flow with respect to the direction of motion of the bulk material. In this manner intensive contact between the individual particles of the bulk material and steam is assured, so that the steam entrains the the solvent adhering to said particles and replaces the entrained amount of solvent by a steam condensate. If only relatively little amounts of solvent should adhere to the bulk material, while on the other hand this bulk material should have a relatively high humidity content, then water may still be added at the end of the treatment of the bulk material to achieve the desired humidity content and density.

We claim:

1. A process for treating added solvent laden bulk material in order to remove added solvents from said bulk material, including the steps of (1) adding to the solvent laden bulk material steam at substantially atmospheric pressure and at a temperature of between 90 and 100 degrees C., the steam condensing at normal temperatures and having a higher boiling point than the added solvent, (2) concurrently mechanically loosening the bulk material and thereby exposing the bulk material to said steam, the temperature of the bulk material being raised by the steam to thereby volatilize the solvent, a portion of the steam remaining in its uncondensed, vapor phase and another portion of the steam being condensed from its vapor phase, (3) expelling by evaucation the volatilized solvent from the bulk material together with said uncondensed part of the steam, the added solvent which initially adhered to the particles of the bulk material being thereby replaced by the condensate of the steam, whereby the added solvent is removed from the bulk material which has been mechanically loosened to form a fluidized bed, including the additional steps of (4) continuously moving the bulk material in a single horizontal direction during the process, (5) passing the steam through the loosened and fluidized bulk material to at least partly retard the bulk material transport speed, (6) passing at least a portion of the steam vertically through the bulk material in a perpendicular direction to the horizontal direction of motion of said bulk material.

2. The method of claim 1 wherein the step (2) of mechanically loosening the material includes moving a plurality of axially spaced tools about a horizontal axis, each said tool thereby rotating in a circular path.

3. The method of claim 2 wherein step (1) includes locally agitating the bulk material by a plurality of sets of rotating, crossed blades and introducing the steam in an area of effectiveness of each set of said crossed blades, said sets of crossed blades being located axially between said rotating tools and each said set rotating about a respective axis generally at right angles to said horizontal axis.

* * * * *